(12) United States Patent
Zheng

(10) Patent No.: US 6,396,928 B1
(45) Date of Patent: *May 28, 2002

(54) DIGITAL MESSAGE ENCRYPTION AND AUTHENTICATION

(75) Inventor: Yuliang Zheng, Patterson Lakes (AU)

(73) Assignee: Monash University, Clayton (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 76 days.

(21) Appl. No.: 08/957,613

(22) Filed: Oct. 24, 1997

(30) Foreign Application Priority Data

Oct. 25, 1996 (AU) .............................................. PO3234

(51) Int. Cl.$^7$ .............................. H04L 9/08; H04L 9/30; H04L 9/32
(52) U.S. Cl. ....................... 380/285; 380/283; 713/168; 713/169; 713/170; 713/181
(58) Field of Search .............................. 380/28, 21, 23, 380/24, 30, 283, 285; 709/228; 713/168, 169, 170, 171, 176, 181

(56) References Cited

U.S. PATENT DOCUMENTS

| | | | | |
|---|---|---|---|---|
| 5,754,656 A | * | 5/1998 | Nishioka et al. | 380/25 |
| 5,796,832 A | * | 8/1998 | Kawan | 380/24 |
| 5,799,088 A | * | 8/1998 | Raike | 380/30 |
| 5,889,861 A | * | 3/1999 | Ohashi et al. | 380/21 |
| 5,889,862 A | * | 3/1999 | Ohta et al. | 380/24 |
| 5,889,865 A | * | 3/1999 | Vanstone et al. | 380/25 |
| 6,064,741 A | * | 5/2000 | Horn et al. | 380/285 |

FOREIGN PATENT DOCUMENTS

DE          195 14 084 C1 *  7/1996  ............. H04L/9/00

OTHER PUBLICATIONS

Translation into English of Horn et al., DE Patent No. 195 14 084 C1, Jul. 11, 1996, pp. 1–22.*

B. Schneier, "Applied Cryptography, Second Edition: Protocols, Algorithms, and Source Code in C," John Wiley & Sons, Oct. 18, 1995, pp. 270–278; 475–479; 483–494; and 510–512.*

* cited by examiner

Primary Examiner—Gilberto Barron, Jr.
Assistant Examiner—Justin T. Darrow
(74) Attorney, Agent, or Firm—Baker Botts L.L.P.; Jeffrey D. Sullivan

(57) ABSTRACT

A method and system for performing digital message encryption and signature encoding for use in, for example, communications and digital information storage systems, For secure communication of digital messages it is necessary to both encrypt the message and sign the message with a digital signature scheme to allow for authentication by the receiver. In order to the computational efficiency and reduce communications overhead in secure communications, a method and system, referred to as "signcryption", are provided in which the processes of encryption and authentication are combined. The principles of public key cryptography are utilised, although any suitable keyed encryption algorithm can be employed for the message encoding. Examples of signature schemes which can be easily implemented by signcryption include the ElGamal, Schnorr and Digital Signature Standard. Messages to multiple separate recipients can be efficiently dealt with, and because of the low computational and communications overheads the signcryption method is particularly applicable for use in smart cards and for highly secure and authenticated key transport over ATM.

20 Claims, 2 Drawing Sheets

DIGITAL MESSAGE ENCRYPTION AND AUTHENTICATION

This invention relates to a method and system for performing digital message signature and encryption for secure and authenticated communication.

To avoid forgery and ensure confidentiality of a message, for example the contents of a letter, for centuries it has been a common practice for the originator of the letter to sign his/her name on it and then seal it in an envelope, before effecting delivery. More recently, digital messages, communicated telephonically or the like, have become increasingly used, and public key cryptography has been employed to conduct secure and authenticated communications.

It is thereby possible for people who have never met before to communicate with one another in a secure and authenticated way over an open and insecure network such as Internet. In doing so the same two-step approach used for conventional letters has been followed. Namely, before a message is sent out, the sender of the message would sign it using a digital signature scheme, and then encrypt the message (and the signature) using a private key encryption algorithm under a randomly chosen message encryption key. The random message encryption key would then be encrypted using the recipients public key. This two-step approach is referred to as signature-then-encryption.

Signature generation and encryption consume machine cycles, and also introduce "expanded" bits to an original message. Hence the cost of a cryptographic operation on a message is typically measured in the message expansion rate and the computational time invested by both the sender and the recipient. With the current standard signature-then-encryption, the cost of delivering a message in a secure and authenticated way is essentially the sum of the cost for digital signature and that for encryption.

The present invention aims to provide a method and system, referred to as "signcryption", in which the processes of encryption and authentication of a message are combined so as to achieve improved computational efficiency and reduced message transmission overhead.

In accordance with the present invention, there is provided a method for authenticated encryption of a digital message m for transmission from a sender having a public key $y_a$ and a secret key $x_a$ and a receiver having a public key $y_b$ and a secret key $x_b$, comprising:
  determining a message key k using the receiver public key and a randomly selected number x;
  calculating a first message parameter r, comprising a message authentication code from said digital message m and a first portion of said message key k;
  calculating a second message parameter s from the sender private key, the randomly selected number x and the first message parameter r, such that said message key k is recoverable by the receiver from an arithmetic operation of said first and second message parameters, the sender public key and the receiver private key; and
  encrypting said digital message m using a second portion of said message key k to obtain cipher text c.

Preferably the cipher text c is transmitted from said sender to said receiver together with said first and second message parameters. The receiver may then recover the message key k from said first and second message parameters with said sender public key and said receiver private key, and decrypt the cipher text c using the second portion of the recovered message key to obtain said digital message. The recovered digital message can then be validated by calculating the first message parameter using the recovered digital message and the first portion of the recovered message key and making a comparison with the first message parameter received with the cipher text.

In one form of the invention the message key k is calculated according to $k = y_b^x \mod p$, where p is a large prime. Before splitting the message key into first and second portions, it is possible to apply a ore-way hashing or folding function, for example, in order to obtain first and second message key portions which are of suitable length for calculating said first message parameter and encrypting said digital message, respectively.

Preferably, the first message parameter comprises a keyed hash of the digital message using the first portion of the message key.

Preferably the second message parameter is calculated according to a modified ElGamal signature scheme in which the hashed digital message value is replaced by the value 1 or the first message parameter. A similar modification of the Schnorr signature scheme or Digital signature standard may similarly be used to calculate the second message parameter.

The digital message itself may be encrypted using any suitable keyed encryption algorithm, such as the Digital Encryption Standard (DES), or the like.

Advantageously, the only data required to be transmitted between the sender and receiver to enable secure authenticated message delivery is the cipher text c and the first and second message parameters r and s, because the message key can be recovered from the first and second message parameters, and the message content can be verified using the message key and the first message parameter r.

The present invention also provides a method of preparing a digital message m for secure and authenticated communication from a sender having a public key $y_a$ and a private key $x_a$ to a receiver having a public key $y_b$ and a private key $x_b$, comprising:
  determining a message key k based on the receiver public key $y_b$ and a randomly selected number x;
  splitting the message key k into first and second keys $k_1$ and $k_2$;
  calculating a first message parameter r as a keyed hash of said digital message using said first key $k_1$;
  calculating a second message parameter s on the basis of said randomly selected number x, said sender secret key $x_a$ and said first message parameter r;
  encrypting said digital message using said second key $k_2$ to obtain cipher data c; and appending said cipher data c with said first and second message parameters for transmission to said receiver.

In a system for transmission of digital messages between a sender having a public key $y_a$ and a secret key $x_a$ and a receiver having a public key $y_b$ and a secret key $x_b$, and having public parameters p being a prime number, q being a prime factor of (p−1), and g being an integer in the range 1 to (p−1) with order (p−1) modulo p, the present invention also provides a method for authenticated encryption of a digital message m, comprising the steps of:
  selecting a random number x in the range 1 to (p−1) such that x does not divide (p−1); determining a message key;
  splitting the message key k into first and second keys k, and $k_2$;
  calculating a first message parameter r as a keyed hash of said digital message m using said fist key $k_1$;
  calculating a second message parameter s on the basis of modular arithmetic to base q utilising said random number x, said sender private key $x_a$ and said first message parameter r;

encrypting said digital message m using said second key $k_2$ to obtain cipher data c; and appending said cipher data c with said first and second message parameter r and s for transmission to said receiver.

The preset invention further provides a method for secure and authenticated communication of a digital message m from a sender having a public key $y_a$ and a private key $x_a$ to a receiver having a public key $y_b$ and a private key $x_b$, comprising.

determining a message key k based on the receiver public key $y_b$ and a randomly selected number x;

splitting the message key k into first and second keys $k_1$ and $k_2$;

calculating a first message parameter r as a keyed hash of said digital message using said first key $k_1$;

calculating a second message parameter s on the basis of said randomly selected number x, said sender secret key $x_a$ and said first message parameter r;

encrypting said digital message using said second key $k_2$ to obtain cipher data c;

transmitting the cipher data c and the first and second message parameters r and s to said receiver;

recovering said message key from an operation using said first and second message parameters r and s, said sender public key $y_a$ and said receiver private key $x_b$;

recovering said first and second keys $k_1$ and $k_2$ from said message key k;

decrypting said cipher data c using the second key $k_2$ to recover said digital message m; and validating said digital message using said first key $k_1$ and said fist message parameter r.

Moreover, the present invention provides an apparatus for preparing a digital message m for secure and authenticated communication from a sender having a public key $y_a$ and a private key $x_a$ to a receiver having a public key $y_b$ and a private key $x_a$, comprising means for determining a message key k based on the receiver public key $y_b$ and a randomly selected number x;

means for splitting the message key k into first and second keys $k_1$ and $k_2$;

means for calculating a first message parameter r as a keyed hash of said digital message using said first key $k_1$;

means for calculating a second message parameter s on the basis of said randomly selected number x, said sender wart key $x_a$ and said first message parameter r;

means for encrypting said digital message using said second key $k_2$ to obtain cipher data c; and means for appending said cipher data c with said first and sound message parameters for transmission to said receiver.

In the preferred form of the invention, the means for carrying out the functions of the invention are incorporated in digital processing circuitry provided on one or more integrated circuits. The authenticated encryption of the invention may be implemented by a digital processing circuit such as a microprocessor, operating under control of stored program instructions accessed from a memory circuit or the like. The present invention is particularly suitable for use in sending authenticated ad encrypted massage data from a smart card or the like.

The invention is described in greater detail hereinafter, by way of example only with reference to several embodiments thereof and the accompanying drawings, where:

Figure 1:
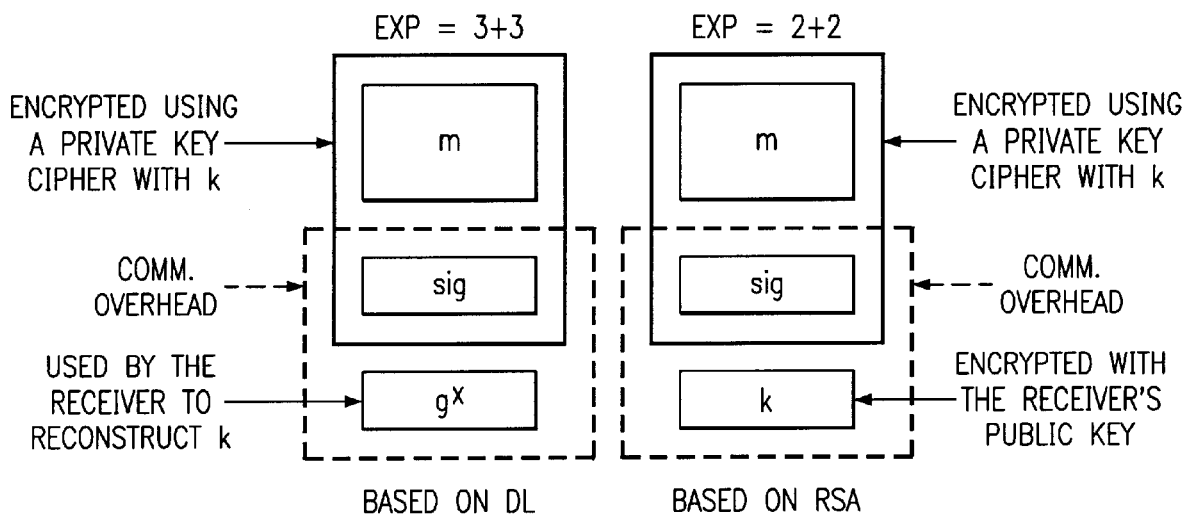
FIG. 1 is a diagrammatic representation of the authentic encrypted message format based on discrete logarithm and RSA systems

As mentioned above, the use of public key cryptography enables a person to digitally sign a message, and send the message securely to another person with whom no common encryption key has been shared. Several known public key digital signature/encryption schemes are summarised below, these being RSA encryption and signature scheme, ElGamal encryption and signature scheme, and two signature schemes derived from ElGamal, namely Schnorr signature scheme and Digital Signature Standard (DSS).

To assist the description of the various schemes, consider a situation where a user (say Alice) wishes to deliver a message to another user (say Bob) over an open insecure communication network such as Internet. The term hash is used to denote a one-way hash algorithm such as SHS [National Institute of Standards and Technology. Secure hash standard. Federal Information Processing Standards Publication FIPS PUB 180-1, U.S. Department of Commerce, April 1995] and HAVAL [Y. Zheng and J. Seberry Immunizing public key cryptosystems against chosen ciphertext works. IEEE Journal on Selected Areas in Communications, 11(5):715–724, June 1993]. The symbols E and D are used to denote the encryption and decryption algorithms of a private key cipher such as DES [National Bureau of Standards. Data encryption standard. Federal Information Processing Standards Publication FIPS PUB 46, U.S. Department of Commerce, January 19771]. Encrypting a message m with a key k, typically in the cipher block chaining or CBC mode, is indicated by $E_k(m)$, while decrypting a ciphertext C with k is denoted by $D_k(c)$.

RSA Signature and Encryption

The RSA scheme is based on the difficulty of factoring large composite numbers. To use RSA, Alice first has to choose two large random primes $p_a$ and $q_a$. She then calculates the products $n_a = p_a q_a$ and $j(n_a) = (p_a-1)(q_a-1)$. Next she selects two numbers $e_a$ and $d_a$ from $(1, \ldots, n_a)$ such that $e_a d_a = 1 \bmod \phi(n_a)$. Finally Alice publishes $(e_a, n_a)$ as her public key in a public key file, while she keeps $d_a$ as her secret key.

Alice's signature on a message m is defined as $s = \text{hash}(m)^{d_a} \bmod n_a$. Other users can verify whether s is Alice's valid signature on m by checking whether hash(m) is identical to $s^{e_a} \bmod n_a$.

Similarly to Alice, user Bob can create his public key $(e_b, n_b)$ and secret key $d_b$. To send a (long) message m to Bob in a secure way, Alice picks a random message-encryption key k and sends to Bob $c = E_k(m)$ and $c_2 = k^{e_b} \bmod n_b$. Upon receiving $c_1$ and $c_2$, Bob can retrieve k by calculating $c_2^{d_b} \bmod n_b$, with which he can decrypt $c_1$.

ElGamal Signature and Encryption

ElGamal digital signature and encryption schemes are based on the hardness of computing discrete logarithm over a large finite field. It involves two parameters public to all users:

1. p: a large prime.
2. g; an integer in $[1, \ldots, p-1]$ with order p−1 modulo p.

User Alice's secret key is an integer $x_a$ chosen randomly from $[1, \ldots, p-1]$ with $x_a$ X$(p-1)$ (i.e., $x_a$ does not divide $p-1$), and her public key is $y_a = g^{x_a}$ mod p.

Alice's signature on a message m is composed of two numbers r and s which are defined as $$r = g^x \text{ mod } p$$

$$s = (hash(m) - x_a \cdot r)/x \text{ mod } p-1$$

where x is a random number from $[1, \ldots, p-1]$ with x X $(p-1)$. It should be noted that for the purposes of security, x should be chosen independently at random every rime a message is to be signed by Alice.

Given (m, r, s), one can verify whether $g^{hash(m)} = y_a^r \cdot r^s$ mod p is satisfied. (r, s) is regarded as Alice's signature on m only if the equation holds.

Now assume that Bob has also chosen his secret key $x_b$ randomly from $[1, \ldots, p-1]$ with $x_b$ X $(p-1)$, and made public the marching public key $y_b = g^{x_b}$ mod p. By using Bob's public key, Alice can send him messages in a secure way. To do this, Alice chooses, for each message m, a random integer x from $[1, \ldots, p-1]$ with x X $(p-1)$, calculates $k = y_b^k$ mod p and sends to Bob $c_1 = E_k(m)$ and $c_2 = g^x$ mod p.

Upon receiving $c_1$ and $c_2$, Bob can recover k by $k = c_2^{x_b}$ mod p. He can then use k to decrypt $c_1$ and obtain m.

Note that ElGamal encryption can also be achieved using parameters for the Schnorr signature and DSS described below.

Schnorr Signature Scheme

The Schnorr signature scheme, together with DSS described below, is a variant of the ElGamal signature scheme. The main idea behind the two variants is to choose g to be an integer in the range $[1, \ldots, p-1]$ with order q modulo p for a prime factor q of $p-1$, instead of with order $p-1$ modulo p.

The Schnorr signature scheme involves the following parameters:
1. Parameters public key to all users:
   (a) p: a large prime, say $p \geq 2^{512}$.
   (b) q; a prime factor of $p-1$. The size of q would be at least $2^{144}$.
   (c) g: an integer in $[1, \ldots, p-1]$ with order q modulo p. In practice, g is obtained by calculating $g = h^{(p-1)/q}$ mod p where h is an integer satisfying $1 < h < p-1$ and $h^{(p-1)/q}$ mod $p > 1$.
2. Parameters specific to user Alice:
   (a) Alice's secret key: a number $x_a$ drawn randomly from $[1, \ldots, q-1]$.
   (b) Alice's public key: $y_a = g^{x_a}$ mod p.

With the above parameters, Schnorr suggests that Alice sign a digital document m by picking a random x from $[1, \ldots, q-1]$ and appending to m a pair of numbers (r,s) which are calculated as follows;

$$r = hash(g^x \text{ mod } p, m)$$

$$s = x + x_a \cdot r \text{ mod } q$$

The procedure for other people to verify Alice's signature (r,s) on m is straightforward: checking whether r is identical to hash $(g^s x\, y_a^r \text{ mod } p), m)$.

If Alice publishes $y_a = g^{x_a}$ mod p, instead of $y_a = g^{-x_a}$ mod p, then s can be defined as $s = x - x_a \times r$ mod q. Signature verification is the same.

Digital Signature Standard (DSS)

The public and secret parameters involved in DSS are all the same as those in Schnorr signature scheme, except that for DSS, Alice's public key is $y_a = g^{x_a}$ mod p, but not $y_a = g^{-x_a}$ mod p as is the case for Schnorr signature scheme. In addition, the standard suggest that, for current applications, |p| be between 512 and 1024, |q|=160, and SHS whose output has 160 its be used as the one-way hash function.

Alice's signature on a message m is composed of two numbers r and s which are defined as $$r = (g^x \text{ mod } p) \text{ mod } q$$

$$s = (hush(m) + x_a \cdot r)/x \text{ mod } q$$

where x is a random number chosen from $[1, q-1]$.

Given (m, r, s), one can verify whether (r,s) is indeed Alice's signature on m by the following steps:
1. calculates $v = (g^{hash(m)/s} \times y_a^{r/s} \text{ mod } p) \text{ mod } q$.
2. accepts (r,s) as valid only if v=r.

Table 1 presented below compares the computational cost and communication overhead of the signature and encryption schemes. Note that to use RSA signature in a provably secure way, more extra computational effort (not shown in the table) has to be invested in the signing process. Similarly, to employ RSA and ElGamal encryptions in a provably secure fashion, more computational effort and communication overhead is required.

| Scheme | Computational cost | Communication overhead (in bits) |
|---|---|---|
| RSA encryption | EXP = 1, ENC = 1 [EXP = 1, DEC = 1] | $\|n_b\|$ |
| ElGamal encryption | EXP = 2, ENC = 1 [EXP = 1, DEC = 1] | $\|p\|$ |
| RSA signature | EXP = 1, HASH = 1 [EXP = 1, HASH = 1] | $\|n_a\|$ |
| ElGamal signature | EXP = 1, MUL = 1, DIV = 1 ADD = 1, HASH = 1 [EXP = 3, MUL = 1, DIV = 0 ADD = 0, HASH = 1] | $2\|p\|$ |
| Schnorr signature | EXP = 1, MUL = 1, ADD = 1, HASH = 1 [EXP = 2, MUL = 1, ADD = 0, HASH = 1] | $\|KH(\cdot)\| + \|q\|$ |
| DSS | EXP = 1, MUL = 1, DIV = 1 ADD = 1, HASH = 1 [EXP = 2, MUL = 1, DIV = 2 ADD = 0, HASH = 1] | $2\|q\|$ | where
EXP=the number of modulo exponentiations,
MUL=the number of modulo multiplications,
DIV=the number of modulo division (inversion),
ADD=the number of modulo addition or sub on,
HASH=the number of one-way or keyed hash operations,
ENC=the number of encryptions using a private key cipher,
DEC=the number of decryptions using a private key cipher,
Parameters in the brackets indicate the number of operations involved in verification or decryption.
Table 1: Cost of RSA, ElGamal, Schnorr, DSS Currently, the standard approach for a user, say Alice, to send a secure and authenticated message to another user Bob is signature-then on. FIG. 1 shows the format of a ciphertext in a signature-then-encryption based on discrete logarithm against that based on RSA. The notation EXP=$N_1$+$N_2$ used in the figure indicates the relative computational expense, where $N_1$ represents the number of modulo exponentiations carried out by a sender, and $N_2$ represents the number by a recipient.

To compare the efficiency of two different methods for secure and authenticated message delivery, consider first the two types of "cost" involved: (1) computational cost, and (2) communication overhead (or storage overhead for stored messages). The computational cost indicates how much computational effort has to be invested both by the sender and the recipient of a message. An estimate of the computational cost can be obtained by counting the number of dominant operations involved. Typically these operations include private key encryption and decryption, hashing, modulo addition, multiplication, division (inversion), and more importantly, exponentiation. In addition to computational cost digital signature and encryption based on public key cryptography also require extra bits to be appended to a message, which constitute the communication overhead.

An embodiment of the present invention, referred to herein as a digital "signcryption" scheme, is a cryptographic method that fulfills both the functions of secure encryption and digital signature, but with a cost smaller than that required by signature then encryption Using the terminology in cryptography, it comprises a pair of (polynomial time) algorithms. (S,U), where S is called the "signcryption" algorithm, while U the "unsigncryption" algorithm. (S, U) should satisfy the following conditions:

1. Unique unsigncryptability—Given message m, the algorithm S signcrypts m and outputs a signcrypted text c. On input c, the algorithm U unsigncrypts c and recovers the original message un-ambiguously.
2. Security—(S, U) fulfills, simultaneously, the properties of a secure encryption scheme and those of a secure digital signature scheme. These properties mainly include: confidentiality of message contents, unforgeability, and non-repudiation.
3. Efficiency The computational cost, which includes the computational time involved both in signcryption and unsigncryption, and the communication overhead or added redundant bits, of the scheme is smaller than that required by known signature-then-encryption schemes.

Since its introduction in 1985 [11], the ElGamal signature scheme has been generalized and adapted to numerous different forms (see for instance [15] where an exhaustive survey of some 13000 ElGamal based signatures has been carried out.) For most ElGamal based schemes, the size of the signature (r, s) on a message is 2|p|, |q|+|p| or 2|q|, where p is a large prime and q is a prime factor of p−1. The size of an ElGamal based signature, however, can be reduced by using a modified "seventh generalization" method. In particular, it is possible to change the calculations of r and s as follows:

1. Calculation of r–Let r=hash (k, m), where k=$g^x$ mod q (k=$g^x$ mod p−1 if the original r is calculated modulo (p−1)), x is a random number from [1, . . . , q] (or from [1, . . . , p−1] with x·(p−1), and hash is a one-way hash function such as Secure Hash Standard or HAVAL.
2. Calculation of s—For an efficient ElGamal based signature scheme the calculation of (the original) s from $x_a$, x, r and optionally, hash(m) involves only simple arithmetic operations, including modulo addition, subtraction, multiplication and division. Here it is assumed that $x_a$ is the secret key of Alice the message originator. Her matching public key is $y_a$=$g^{x_a}$ mod p. The calculation of s can be modified in the following way:
   (a) If hash(m) is uninvolved in the original s, hash(m) is replaced with a number 1, but r is left intact. The other way may also be used, namely changing r to 1 and then replacing hash(m) with r.
   (b) If s has the form of s=(· · ·)x, then change it to s= x/(· · ·) does not add additional computational cost to signature generation, but may reduce the cost for signature verification.

To verify whether (r, s) is Alice's signature on m, the value of k=$g^x$ mod p is recovered from g, $y_a$, r and s, and then hash(k, m) is compared to r.

Table 2 presented below shows two shortened versions of the Digital Signature Standard (DSS) formed by the shortening technique described above, which are denoted by SDSS1 and SDSS2 respectively. The parameter p, q and g are the same as those for standard DSS, x is a random number from [1, . . . , q], $x_a$ is Alice's secret key and $y_a$=$g^{x_a}$ mod p is her matching public key, |t| denotes the size or length (in bits) of t. SDSS1 is slightly more efficient than SDSS2 in signature generation, as the latter involves an extra modulo multiplication. It can be shown that the shortened signature schemes SDSS1 and SDSS2 are unforgeable under the assumption that the one-way hash function behaves like a random function.

| Shortened schemes | Signature (r, s) on a message m | Recovery of k = $g^x$ mod p | Length of signature |
|---|---|---|---|
| SDSS1 | r = hash ($g^x$ mod p, m) <br> s = x/(r + $x_a$) mod q | k = $(y_a \cdot g^r)^s$ mod p | \|hash ( · )\| + \|q\| |
| SDSS2 | r = hash ($g^x$ mod p, m) <br> s = x/(1 + $x_a$ · r) mod q | k = $(g \cdot y_a^r)^s$ mod p | \|hash ( · )\| + \|q\| | p: a large prime (public to all),
q: a large prime factor of p−1 (public to all),
g: an integer in [1, . . . , p−1] with order q modulo p (public to all),
$x_a$: Alice's secret key,
$y_a$: Alice's public key ($y_a$=$g^{x_a}$ mod p).

Table 2: Examples of Shortened and Efficient Signature Schemes

A characteristic of a shortened ElGamal based signature scheme obtained in the method described above is that although $g^x$ mod p is not explicitly contained in a signature (r,s), it can be recovered from r, s and other public parameters. This enables the construction of a signcryption system from a shortened signature scheme such as the two shortened signature schemes SDSS1 and SDSS2, as described in detail hereinbelow. The same construction method is applicable to other shortened signature schemes based on ElGamal. Also, Schnorr's signature scheme, without being further shortened, can be used to construct a signcryption scheme which is slightly more advantageous in computation than other signcryption schemes from the view point of a message originator. The terms E and D are used below to denote the encryption and decryption algorithms of a private key cipher such as DES. Encrypting a message m with a key k, typically in the cipher block chaining or CBC mode, is indicated by $E_k$(m), while decrypting a ciphertext c with k is denoted by $D_k$(c). In addition $KH_k$(m) is used to denote hashing a message m with a key-ed hash algorithm K H under a key k. An important property of a keyed hash function is that, just like a one-way hash function, it is collision-intractable. Therefore it can be used as an efficient message authentication code. Two methods for constructing a cryptographically strong key-ed hash algorithm from a one-way hash algorithm are described, for ample, [1]. For most practical applications, it suffices to define $K H_k(m) =$ hash(k, m,), where hash is a one-way hash algorithm.

Assume that Alice also has chosen a secret key $x_a$ from $[1, \ldots, q]$, and made public her matching public key $y_a = g^{x_a}$ mod p. Similarly, Bob's secret key is $x_b$ and his matching public key is $y_b = g^{x_b}$ mod p. Relevant public and secret parameters are summarized as follows:

Parameters public to all:

p—a large prime q—a large prime factor of p−1 q—an integer in $[1, \ldots, p-1]$ with order q modulo p

K H—a keyed one-way hash function (E, D)—the encryption and decryption algorithms of a private key cipher Alice's keys:

$x_a$—Alice's secret key $y_a$—Alice's public key ($y_a = g^{x_a}$ mod p)

Bob's keys;

$x_b$—Bob's secret key $y_b$—Bob's public key ($y_b = g^{x_b}$ mod p)

For Alice to signcrypt a message m for Bob, she carries out the following:

Signcryption by Alice the Sender

1. Pick x randomly from $[1, \ldots, q]$, and let $k = y^{x_b}$ mod p. Split k into $k_1$ and $k_2$ of appropriate length. (Note: one-way hashing, or even simple folding, may be applied to k prior splitting, if $k_1$ or $k_2$ is too long to fit in E or K H, or one wishes $k_1$ and $k_2$ to be dependent on all bits in k.)
2. $r_{k_2}(m)$.
3. $s = x/(r + x_a)$ mod q if SDSS1 is used, or $s = x/(1 + x_a \cdot r)$ mod q if SDSS2 is used instead.
4. $c = E_{k_1}(m)$.
5. Send to Bob the signcrypted text (c, r, s).

The unsigncryption algorithm takes advantage of the property that $g^x$ mod p can be recovered from r, s, g and $y_a$ by Bob. On receiving (c, r, s) from Alice, Bob unsigncrypts it as follows:

Unsigncryption by Bob the Recipient

1. Recover k from r, s, g, p, $y_a$ and $x_b$; $k = (y_a \cdot g^r)^{s \cdot x_b}$ mod p if SDSS1 is used, or $k = (g \cdot y_a^r)^{s \cdot x_b}$ mod p if SDSS2 is used.
2. Split k into $k_1$ and $k_2$.
3. $m = D_{k_1}(c)$.
4. accept m as a valid message originated from Alice only if $K H_{k_2}(m)$ is identical to r.

Figure 2:
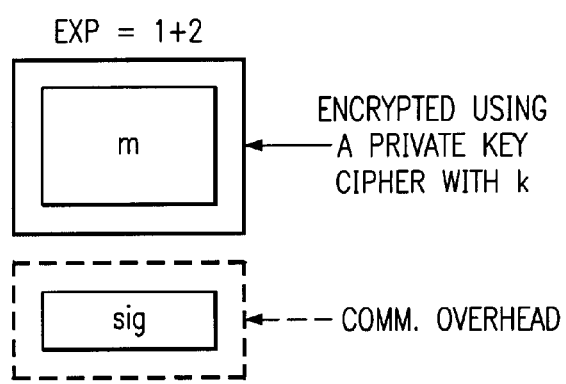
FIG. 2 is a diagrammatic representation of a signcrypted message format.

The format of the signcrypted text of a message m is depicted in FIG. 2, while the table below summarises the two signcryption schemes, denoted by SCS1 and SCS2, which are constructed from SDSS1 and SDSS2 respectively.

The two signcryption schemes share the same communication overhead ($|hash(\cdot)| + |q|$). Although SCS1 involves one less modulo multiplication in signcryption does SCS2, both have a similar computational cost for unsigncryption.

| Signcryption schemes | Signcrypted text (c, r, s) of a message m (by Alice) | Recovery of $k = g^{s \cdot x_b}$ mod p (by Bob) |
|---|---|---|
| SCS1 (from SDSS1) | $c = E_{k_1}(m)$<br>$r = KH_{k_2}(m)$<br>$s = x/(r + x_a)$ mod q | $k = (y_a \times g^r)^{s \cdot x_b}$ mod p |
| SCS2 (from SDSS2) | $c = E_{k_1}(m)$<br>$r = KH_{k_2}(m)$<br>$s = x/(1 + x_a \times r)$ mod q | $k = (g \times y_a^r)^{s \cdot x_b}$ mod p |

On Alice's side, x is a number chosen independently at random from $[1, \ldots, q]$, k is obtained by $k = y_b^x$ mod p, $k_1$ and $k_2$ are the left and right halves of k respectively. (One-way hashing or folding may be applied to k prior splitting.) Bob can recover k from $x_b$, r, s, g and $y_a$, and decipher c by $m = D_{k_1}(c)$. He accepts m as a valid message from Alice only if r can be reconstructed from $KH_{k_2}(m)$.

A significant advantage of signcryption over signature-then-encryption lies in the dramatic reduction of computational cost and communication overhead which can be symbolize by the following inequality:

$$\text{Cost(signcryption)} < \text{Cost(signature)} + \text{Cost(encryption)}.$$

The table below illustrates the major computations and resulting communications overhead for three prior art signature-then-encryption schemes, and for the two examples of signcryption described above.

| Various schemes | Computational cost | Communication overhead (in bits) |
|---|---|---|
| signature-then-encryption based on RSA | EXP = 2, HASH = 1, ENC = 1<br>[EXP = 2, HASH = 1, DEC = 1] | $\|n_a\| + \|n_b\|$ |
| signature-then-encryption based on DSS + ElGamal encryption | EXP = 3, MUL = 1, DIV = 1<br>ADD = 1, HASH = 1, ENC = 1<br>[EXP = 3, MUL = 1, DIV = 2<br>ADD = 0, HASH = 1, DEC = 1] | $2\|q\| + \|p\|$ |
| signature-then-encryption based on Schnorr signature + ElGamal encryption | EXP = 3, MUL = 1, DIV = 0<br>ADD = 1, HASH = 1, ENC = 1<br>[EXP = 3, MUL = 1, DIV = 0<br>ADD = 0, HASH = 1, DEC = 1] | $\|KH(\cdot)\| + \|q\| + \|p\|$ |
| signcryption SCS1 | EXP = 1, MUL = 0, DIV = 1<br>ADD = 1, HASH = 1, ENC = 1<br>[EXP = 2, MUL = 2, DIV = 0<br>ADD = 0, HASH = 1, DEC = 1] | $\|KH(\cdot)\| + \|q\|$ |
| signcryption SCS2 | EXP = 1, MUL = 1, DIV = 1<br>ADD = 1, HASH = 1, ENC = 1<br>[EXP = 2, MUL = 2, DIV = 0<br>ADD = 0, HASH = 1, DEC = 1] | $\|KH(\cdot)\| + \|q\|$ | where

EXP = the number of modulo exponentiations,

MUL = the number of modulo multiplications,

DIV = the number of modulo division (inversion),

ADD = the number of modulo addition or subtraction,

HASH = the number of one-way or key-ed hash operations,

ENC = the number of encryptions using a private key cipher,

DEC the number of decryptions using a private key cipher,

Parameters in the brackets indicate the number of operations involved in "decryption-then-verification" or "unsigncryption".

An example of the savings in computation and communication overhead which can be achieved by an embodiment of the present invention is illustrated in the table below, where a signcryption scheme is compared with a signature-then-encryption procedure using Schnorr signature and ElGamal encryption, for various sizes of security parameters.

| security parameters $\|p\|, \|q\|,$ $\|KH(\cdot)\|(=\|hash(\cdot)\|)$ | saving in computational cost | saving in communications overhead |
|---|---|---|
| 512, 144, 72 | 50% | 70.3% |
| 768, 152, 80 | 50% | 76.8% |
| 1024, 160, 80 | 50% | 81.0% |
| 1280, 168, 88 | 50% | 83.3% |
| 1536, 176, 88 | 50% | 85.3% |
| 1792, 184, 96 | 50% | 86.5% |
| 2048, 192, 96 | 50% | 87.7% |
| 2560, 208, 104 | 50% | 89.1% |
| 3072, 224, 112 | 50% | 90.1% |
| 4096, 256, 128 | 50% | 91.0% |
| 5120, 288, 144 | 50% | 92.0% |
| 8192, 320, 160 | 50% | 94.0% |
| 10240, 320, 160 | 50% | 96.0% |

In order to handle repudiation with a signature-then-encryption scheme, if Alice denies the fact that she has sent to Bob a message, all Bob has to do is to present to a judge (say Julie) the message together with its associated signature by Alice, based on which the judge will be able to settle a dispute, with digital signcryption, however, the verifiability of a signcryption is in normal situations limited to Bob the recipient, as his secret key is required for unsigncryption. Now consider a situation where Alice attempts to deny the fact that she has signcrypted and sent to Bob a message m, As in signature-then-encryption, Bob would first present the following relevant data items to a judge (Julie): q, p, g $y_a$, $y_b$, m, r and s. It is immediately apparent however, that the judge cannot make a decision using these data alone. Thus a repudiation settlement procedure different from the one for a digital signature scheme is required. In particular, the judge would need Bob's cooperation in order to correctly decide the origin of the message.

To help the judge with her decision, Bob can choose to present to the judge either $x_b$ or k. Since $x_b$ is Bob's secret key, he may not wish to reveal it to the judge even if she is trusted. So the only choice for Bob would be to present k to the judge. Then, in conjunction with other data from Bob, the judge would be able to decide the origin of the message by: (1) spiting k into $k_1$ and $k_2$ and (2) checking whether $r=KH_{k_2}(m)$.

However, this still does not allow the judge to check whether k satisfies the condition $k=u^{x_b}$ mod p, where $u=(y_a \cdot g^r)^s$ mod p for SCS1, and $u=(g \cdot y_a^r)^s$ mod p for SCS2.

In order to preclude Bob from acting dishonestly, it is necessary for the judge to be convinced by Bob that k has the right form, namely $k=u^{x_b}$ mod p, where $x_b$ is Bob's secret key satisfying the condition $y_b=g^{x_b}$ mod p, and $u=(y \cdot g^r)^s$ mod p for SCS1, and $u=(g \cdot y_a^r)^s$ mod p for SCS2. On the other hand, although Bob should be willing to answer the judge's request for proving $k=u^{x_b}$ mod p, he may not wish to leak to the judge any information on his secret key $x_b$. These two seemingly conflicting goals can be simultaneously achieved by the use of a zero-knowledge interactive proof protocol as described below.

Bob first presents to the judge q, p, g, $y_a$, $y_b$, m, r, s, and k Upon receiving the numbers, the judge calculates $u=(y_a \cdot g^r)^s=g^x$ mod p if SCS1 is used, or $u=(g \cdot y_a^r)^a=g^x$ mod p if SCS2 is used instead. Bob wishes to convince the judge that $k=u^{x_b}$ mod p, where $x_b$ is Bob's secret key satisfying $y_b=g^{x_b}$ mod p.

Note that in practice, certificates associated with $y_a$ and $y_b$ should also be submitted to the judge so that she can check their authenticity. Also note that m is not directly used in this convincing protocol. Instead, it will be used by the judge in deciding the origin of the message immediately after tis protocol is successfully completed.

Convincing the Judge

1.

$$\text{Bob} \Longleftarrow \quad J = u^{j_1}, g^{j_2} \bmod p \quad \Longleftarrow \text{Judge}$$

The judge picks two random numbers $j_1$ and $j_2$ from $[1, \ldots, q]$ calculates $J=u^{j_1} \cdot g^{j_2}$ mod p, and sends the result J to Bob.

2.

$$\text{Bob} \Longrightarrow \quad B_1 = J \cdot g^w \bmod p, B_2 = B_1^{x_b} \bmod p \quad \Longrightarrow \text{Judge}$$

Upon receiving J from the judge, Bob picks a random number w from $[1, \ldots, q]$ calculates $B_1=J \cdot g^w$ mod p and $B_2=B_1^{x_b}$ mod p, sends the two resulting numbers to the judge.

3.

$$\text{Bob} \Longleftarrow \quad j_1, j_2 \quad \Longleftarrow \text{Judge}$$

Upon receiving $B_1$, and $B_2$, the judge sends $j_1$, and $j_2$ to Bob.

4.

$$\text{Bob} \Longrightarrow \quad w \quad \Longrightarrow \text{Judge}$$

Bob checks whether $u^{j_1} \cdot g^{j_2}$ mod p is identical to the number J received from the judge in the first move. If it is, Bob sends w to the judge. Otherwise chewing by the judge is detected, and the protocol is aborted.

If the judge receives w from Bob, she checks whether $B_1$ can be recovered from $J \cdot g^w$ w mod p, and $B_2$ recovered from $K^{j_1} \cdot y_b^{j_2+w}$ mod p. The judge is convinced that $k_1^{x_b}$ mod p only if both $J \cdot g^w$ mod $p=B_1$ and $k^{j_1} \cdot y_b^{j_2+w}$ mod $p=B_2$ hold.

Using this protocol, the following three results can be proven:

1. completeness—if k is indeed identical to $u^{x_b}$ mod p, then by following the protocol Bob can always convince the judge of the fact.
2. soundness—the probability for Bob to supply a "wrong" k' with k' ≠ k, and cheat the judge into believing that $k'=u^{x_b}$ mod p is at most 1/q, a vanishingly small probability for $q>=2^{144}$.
3. zero-knowledge—no information on $x_b$ is leaked to the judge.

Once being convinced that $k=u^{x_b}$ mod p, the judge would split k into $k_1$ and $k_2$, decipher c by $m=D_{k_1}(c)$, and check whether r can be re-constructed from $KH_{k_2}(m)$. (m, r, s) will be ruled as being originated from Alice if $r=KH_{k_2}(m)$ holds.

The foregoing description relates to the case of a message which is directed to only a single recipient.

In practice, broadcasting a message to multiple users in a secure and authenticated manner is a useful facility, to enable a group of people who are jointly working on the same project to communicate with one another. In this scenario, a message is broadcast tough a so-called multi cast channel, one of whose properties is that all recipients will receive an identical copy of a broadcast message. Some concerns with encryption and authentication of a message broadcast to multiple recipients include security, unforgeability, non-repudiation and consistency of a message. Consistency means that all recipients recover an identical message from their copies of a broadcast message, and its aim is to prevent a particular recipient from being excluded from the group by a dishonest message originator.

Figure 3:
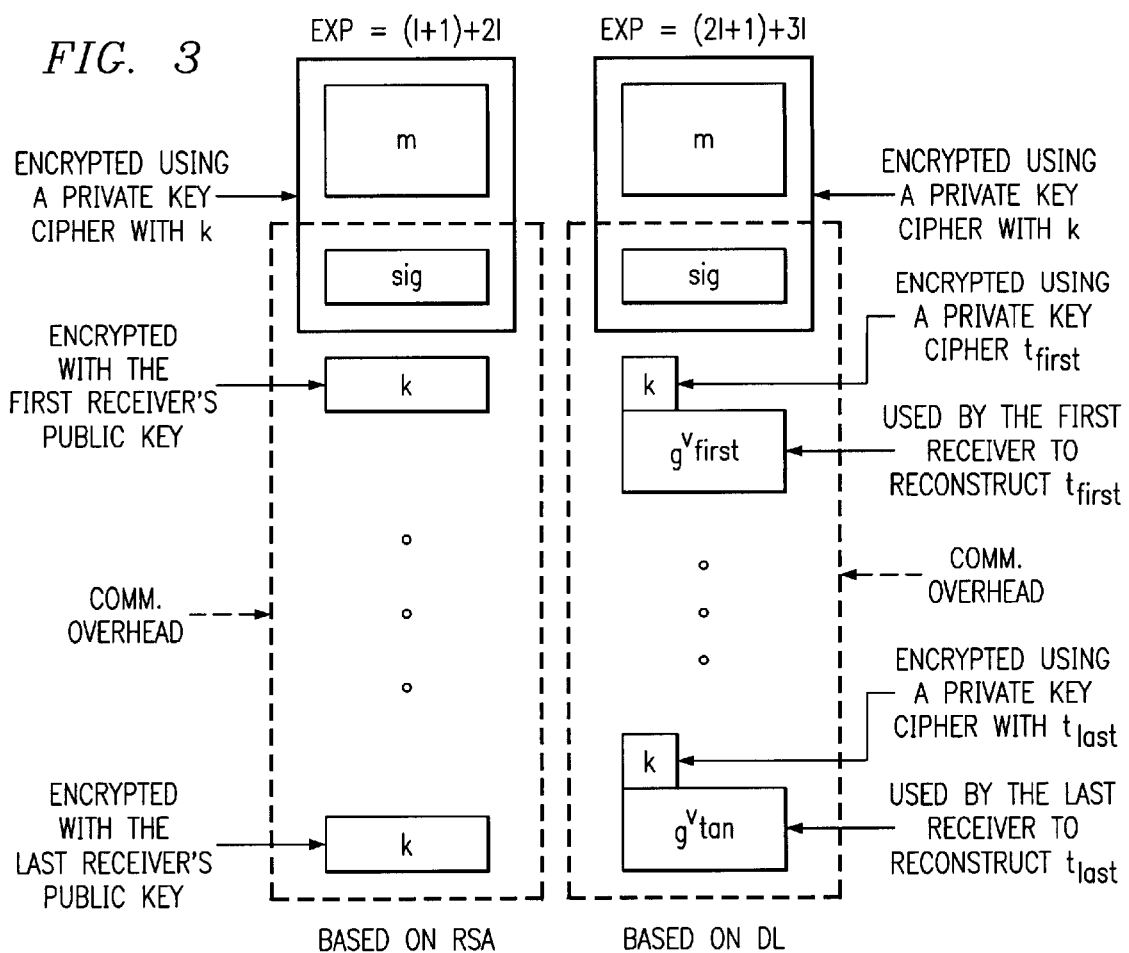
FIG. 3 is a diagrammatic representation of a multiple recipient message format based on RSA and discrete logarithm systems.

With the traditional signature-then-encryption, a common practice has been to encrypt the message-encryption key using each recipient's public key and attach the resulting ciphertext to the signed and also encrypted message. FIG. 3 illustrates the format of a multiple recipient message signed and encrypted based on RSA, and another using a discrete logarithm based approach such as Schnorr signature and ElGamal encryption.

Figure 4:
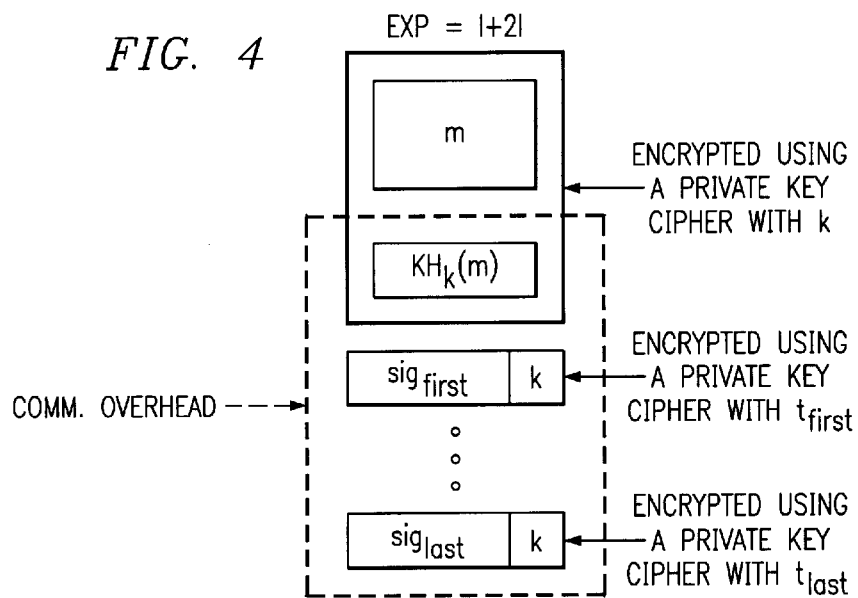
FIG. 4 is a diagrammatic representation of a multiple recipient signcrypted message.

Embodiments of the present invention can also be adapted for multiple recipients. The basic idea is to use two types of keys: the first type consists of only a single randomly chosen key (a message-encryption key) and the second type of keys include a key chosen independently at random for each recipient (called a recipient specific key). The message-encryption key is used to encrypt a message with a private key cipher, while a recipient specific key is used to encrypt the message-encryption key. A multiple recipient signcryption procedure based on SCS is detailed below, referred to as SCSM. The output format of the multiple recipient signcryption is shown in FIG. 4.

Signcryption by the Sender for Multi-Recipients

An input to this signcryption algorithm for multi-recipients consists of a message m to be sent to 1 recipients $R_1, \ldots, R_4$, Alice's secret key $x_a$, $R_i$'s public key $y_i$ for all $1 \leq i \leq 1$, q and p.

1. Pick a random message-encryption key k, calculate $h=KH_k(m)$, and encrypt m by $c=E_k(m\|h)$, where $\|$ denotes concatenation.
2. Create a signcrypted text of k for each recipient $i= 1, \ldots, 1$:
   (a) Pick a random number $v_i$ from $[1, \ldots, q]$ and calculate $t_i=y_i^{v_i}$ mod p. Then split $t_i$ into $t_{i,1}$ and $t_{i,2}$ of appropriate length. (One-way hashing or folding may be applied to k prior splitting.)
   (b) $d_i=E_{t_{i,1}}(k)$.
   (c) $r_i=KH_{t_{i,2}}(m,h)$.
   (d) $s_i=v_i/(r_i+x_a)$ mod p.

Alice then broadcast to all the recipients (c, $d_1, r_1, s_1, \ldots, d_l, r_l, s_l$).

Unsigncryption by Each Recipient

An input to this unsigncryption algorithm consists of a signcrypted at (c, $d_1, r_1, s_1, \ldots, d_l, r_l, s_l$) received through a broadcast channel, together with a recipient $R_i$'s secret key $x_i$ where $1 \leq i \leq 1$, Alice's public key, $y_a$, g, q and p.

1. Find out (c, $d_i, r_i, s_i$) in (c, $d_1, r_1, s_1, \ldots, d_l, r_l, s_l$).
2. $t_i=(y_a \cdot g^{r_i})^{s_i \cdot x_i}$ mod p. Split $t_i$ into $t_{i,1}$ and $t_{i,2}$.
3. $k=D_{t_{i,1}}(d_i)$.
4. $w=D_k(c)$. Split w into m and h.
5. check if h can be recovered from $KH_k(m)$ and r, recovered from $KH_{t_{i,2}}(w)$.

R accepts m as a valid message originated from Alice only if both $h=KH_k(m)$ and $r_i=KH_{t_{i,2}}(w)$ hold.

As discussed earlier, a message delivery scheme for multiple recipients is said to be consistent if messages recovered by the recipients are identical. Such a requirement is important in the case of multiple recipients, as otherwise the sender may be able to exclude a particular recipient from the group of recipients by deliberately causing the recipient to recover a message different from the one recovered by other recipients. With SCS1M message consistency is achieved through the use of two Piques; (1) a message m is encrypted together with the hashed value $h=KH_k(m)$, namely $c=E_k(m\|h)$; (2) m and k are both involved in the formation of r, and $s_i$ through $r_i=KH_{t_{i,2}}(m, h)$. These two techniques effectively prevent a recipient from being excluded from the group by a dishonest message originator.

The confidentiality, unforgeability and non-repudiation of multiple recipient signcryption is similar to the case of a single recipient as discussed above. Further, the multiple recipient signcryption scheme described, as with the single recipient methods, provides significant advantages in computational cost and communications overhead as compared to known signature-then-encryption methods for multiple recipients.

The embodiments of the present invention described herein are compact in both execution and communications requirements, and are particularly well suited for smart card based applications, such as digital cash payment systems, personal health cards and the like. For example the encryption and authentication method of the present invention may be embodied in a series of computer program instructions stored in a memory circuit for execution by a microprocessor or the like. Alternatively, the instructions embodying the invention may be incorporated into a custom made integrated circuit or programmable logic circuit.

Another useful property of the described signcryption schemes is that it enables highly secure and authenticated key transport in a single block whose size is smaller than $|p|$. In particular, using the two described signcryption schemes, it is possible to transport highly secure and authenticated keys in a single ATM cell (48 byte payload+5 byte header). In a similar way, a multi-recipient signcryption scheme can be used as a very economic method for distributing conference keys among a group of user;.

It will be readily recognised by those skilled in the art that various modifications can be made to the described signcryption schemes without departing from the spirit and scope of the present invention. For example, although the calculations described here have been presented in terms of modular arithmetic, any suitable form of finite field calculations may be employed, such as calculations based on elliptic curves over a finite field. Obviously variations in the actual algorithm employed to implement the signcryption will also fall within the scope of the invention where the algorithm still utilises the principles of the present invention as hereinbefore described and as defined in the claims.

Throughout this specification and the claims which follow, unless the contact requires otherwise, the word "comprise", or variations such as "comprises" or "comprising", will be understood to imply the inclusion of a stated integer or group of integers but not the exclusion of any other integer or group of integers.

The foregoing detailed description of embodiments of the invention has been presented by way of example only, and is not intended to be considered limiting to the invention defined in the claims appended hereto.

What is claimed is:

1. A method for authenticatable encryption of a digital message m for transmission from a sender having a public key y, and a private key $x_a$ to a receiver having a public key $y_b$ and a private key $x_b$, comprising;

determining a message key k using the receiver public key and a randomly selected number x;

calculating a first message parameter r, comprising a message authentication code, from said digital message m and a first portion of said message key k;

calculating a second message parameter s from the sender private key, the randomly selected number x and the first message parameter r, such that said message key k is recoverable by the receiver from an arithmetic operation of said first and second message parameters, the sender public key and the receiver private key; and encrypting said digital message m using a second portion of said message key k to obtain cipher text c.

2. A method for transmission of a digital message m from a sender to a receiver, comprising encrypting the digital message according to the authenticatable encryption method defined in claim 1, and transmitting the obtained cipher text c from said sender to said receiver together with the first and second message parameters.

3. A method for recovering a digital message m transmitted according to the method defined in claim 2, comprising receiving at said receiver the transmitted cipher text c and first and second message parameters, recovering the message key k from said first and second message parameters with said sender public key and said receiver private key, and decrypting the cipher text c using the second portion of the recovered message key to obtain said digital message m.

4. A method for validating a digital message m recovered according to the method defined in claim 3, comprising calculating the first message parameter using the recovered digital message and the first portion of the recovered message key and making a comparison with the first message parameter received with the cipher text.

5. A method for authenticatable encryption according to claim 1, wherein the message key k is according to $k = y_b^x$ m mod p, where p is a large prime.

6. A method for authenticatable encryption according to claim 1, wherein a one-way hashing or folding function is applied to the message key k before splitting the message key into first and second portions, in order to obtain first and second message key portions which are of suitable length for calculating said first message parameter and encrypting said digital message, respectively.

7. A method for authenticatable encryption according to claim 1, wherein the first message parameter comprises a keyed hash of the digital message using the first portion of the message key.

8. A method for authenticatable encryption according to claim 1, wherein the second message parameter is calculated according to a modified ElGamal signature scheme in which the hashed digital message value is replaced by the value 1 or the first message parameter.

9. A method for authenticatable encryption according to claim 1, wherein the second message parameter is calculated according to a modified Schnorr signature scheme.

10. A method for authenticatable encryption according to claim 1, wherein the second message parameter is calculated according to a modification of the Digital Signature Standard.

11. A method for authenticatable encryption according to claim 1, wherein the step of encrypting the digital message m is performed utilizing the Digital Encryption Standard (DES).

12. A smart card containing digital processing means programmed or physically arranged to carry out the method defined in claim 1.

13. A method of preparing a digital message m for secure and authenticatable communication from a sender having a public key $y_a$ and a private key $x_a$ to a receiver having a public key $y_b$ and a private key $x_b$, comprising;

determining a message key k based on the receiver public key $y_b$ and a randomly selected number x;

splitting the message key k into first and second keys $k_1$ and $k_2$;

calculating a first message parameter r as a keyed hash of said digital message using said first key $k_1$;

calculating a second message parameter s on the basis of said randomly selected number x, said sender private key $x_a$ and said first message parameter r;

encrypting said digital message using said second key $k_2$ to obtain cipher data c; and appending said cipher data c with said first and second message parameters for transmission to said receiver.

14. In a system for transmission of digital messages between a sender having a public key $y_a$ and a private key $x_a$ and a receiver having a public key $y_b$ and a private key $x_b$, and having public parameters p being a prime number, q being a prime or of (p−1), and g being an integer in the range 1 to (p−1) with order (p−1) modulo p, a method for authenticatable encryption of a digital message m, comprising the steps of;

selecting a random number x in the range 1 to (p−1) such that x does not divide (p−1);

determining a message key;

splitting the message key k into first and second keys $k_1$ and $k_2$;

calculating a first message parameter r as a keyed hash of said digital message m using said first key $k_1$;

calculating a second message parameter s on the basis of modular arithmetic to base q utilizing said random number x, said sender private key $x_a$ and said first message parameter r;

encrypting said digital message m using said second key $k_2$ to obtain cipher data c; and appending said cipher data c with said first and second message parameters r and s for transmission to said receiver.

15. A method for secure and authenticatable communication of a digital message m from a sender having a public key $y_a$ and a private key $x_a$ to a receiver having a public key $y_b$ and a private key $x_b$, comprising:

determining a message key k based on the receiver public key $y_b$ and a randomly selected number x;

splitting the message key k into first and second keys $k_1$ and $k_2$;

calculating a first message parameter r as a keyed hash of said digital message using said first key $k_1$;

calculating a second message parameter s on the basis of said randomly selected number x, said sender private key $x_a$ and said first message parameter r;

encrypting said digital message using said second key $k_2$ to obtain cipher data c;

transmitting the cipher data c and the first and second message parameters r and s to said receiver;

recovering said message key from an operation using said first and second message parameters r and s, said sender public key $y_a$ and said receiver private key $x_b$;

recovering sad first and second keys $k_1$ and $k_2$ from said message key k;

decrypting said cipher data c using the second key $k_2$ to recover said digital message m; and validating said digital message using said first key $k_1$ and said first message parameter r.

16. A smart card containing apparatus as defined in claim 15 for preparing a digital message for secure and authenticated communication from a sender to a receiver.

17. An apparatus for preparing a digital message m for secure and authenticatable communication from a sender having a public key $y_a$ and a private key $x_a$ to a receiver having a public key $y_b$ and a private key $x_b$, comprising:

means for determining a message key k based on the receiver public key $y_b$ and a randomly selected number x;

means for splitting the message key k into first and second keys $k_1$ and $k_2$;

means for calculating a first message parameter r as a keyed hash of said digital message using said first key $k_1$;

means for calculating a second message parameter s on the basis of said randomly selected number x, said sender private key $x_a$ and said first message parameter r;

means for encrypting said digital message using said second key $k_2$ to obtain cipher data c; and means for appending said cipher data c with said first and second message parameters for transmission to said receiver.

18. A method for authenticated encryption of a digital message m for transmission from a sender having a public key $y_a$ and a private key $x_a$ to a plurality of L receivers each having a public key $y_i$ and a private key $x_i$, $1 \leq i \leq L$, comprising:

selecting a random message-encryption key k;

determining a keyed-hash value h for the digital message m using the message-encryption key k;

encrypting the digital message m concatenated with the keyed-hash value h according to an encryption algorithm using the message-encryption key k, to obtain a cipher text c; and for each receiver:

selecting a random number $v_i$ and determining a transmission key $t_i$ using the random number $v_i$ and corresponding receiver public key $y_i$;

splitting the transmission key $t_i$ into first and second transmission keys $t_{i1}$ and $t_{i2}$;

encrypting the message-encryption key k using the first transmission key $t_{i1}$, to obtain an encrypted key $d_i$;

calculating a keyed-hash value $r_i$ of the digital message m together with the keyed hash value h, using the second transmission key $t_{i2}$; and calculating a message parameter $s_i$ using the random number $v_i$, the keyed-hash value $r_i$ and the sender private key $x_a$.

19. A method for secure and authenticatable broadcast transmission of a digital message m to a plurality of receivers, comprising authenticated encryption of the digital message according to the method as defined in claim 18, and transmitting to all receivers the cipher c together with each of the encrypted keys $d_i$, the keyed hash values $r_i$ and the message parameters $s_i$.

20. A method for recovering and authenticating a digital message received at a particular receiver from a broadcast transmission according to the method defined in claim 19, comprising the steps of:

selecting the cipher c and the encrypted key $d_i$, the keyed-hash value $r_i$ and the message parameter $s_i$ corresponding to the particular receiver from the received broadcast transmission;

calculating the transmission key $t_i$ using the sender public key $y_a$, the keyed hash value $r_i$, the message parameter $s_i$ and the particular receiver secret key $x_i$, and splitting the transmission key $t_i$ into first and second transmission, keys $t_{i1}$ and $t_{i2}$;

recovering the message-encryption key k by decrypting the encrypted key $d_i$ according to a decrypting algorithm using the first transmission key $t_{i1}$;

recovering the digital message m and keyed-hash value h by decrypting the cipher c using the recovered message-encryption key k; and authenticating the recovered digital message m by comparing the recovered keyed-hash value h with a keyed-hash of the recovered digital message m using the recovered message-encryption key k, and the received keyed-hash value $r_i$ with a keyed-hash of the decrypted cipher c.

* * * * *

UNITED STATES PATENT AND TRADEMARK OFFICE
CERTIFICATE OF CORRECTION

PATENT NO. : 6,396,928 B1
DATED : May 28, 2002
INVENTOR(S) : Yuliang Zheng

It is certified that error appears in the above-identified patent and that said Letters Patent is hereby corrected as shown below:

Title page,
Item [56], References Cited, OTHER PUBLICATIONS, Schneier reference, "Crypotography" should read -- Cryptography --

Item [57], ABSTRACT,
Line 7, "In order to the" should read -- In order to achieve improved --

Column 1,
Line 24, "recipients" should read -- recipient's --

Column 2,
Line 59, "k," should read -- $k_1$, --
Line 62, "fist" should read -- first --

Column 3,
Line 32, "fist" should read -- first --

Column 4,
Line 56, "C=$E_k$(m)" should read -- $C_1$=$E_k$(m) --

Column 5,
Line 2:, "$x_a$ X(p-1)" should read -- $x_a$ /(p-1) --

Line 10, "x X" should read -- x / --

Line 12, "rime" should read -- time --

Line 18, "$x_b$ X(p-1)," should read -- $x_b$ /(p-1), --

Line 19, "marching" should read -- matching --

Line 22, "x X(p-1)," should read -- x /(p-1), --

Line 23, "$y_b^k$" should read -- $y_b^x$ --
Line 42, "q;" should read -- q: --
Line 64, "x" should read -- × --(times)
Line 66, "s=x-$x_a$ x r mod q." should read -- s=x-$x_a$ × r mod q. --

UNITED STATES PATENT AND TRADEMARK OFFICE
CERTIFICATE OF CORRECTION

PATENT NO.       : 6,396,928 B1
DATED            : May 28, 2002
INVENTOR(S)      : Yuliang Zheng It is certified that error appears in the above-identified patent and that said Letters Patent is hereby corrected as shown below:

<u>Column 6,</u>
Line 6, "standard" should read -- standards --
Line 8, "has 160 its" should read -- can --
Line 14, "hush" should read -- hash --
Line 16, "[1, q-1]." should read -- [1, ..., q-1]. --
Line 19, "x" should read -- × --
Line 55, "sub on," should read -- subtraction --
Line 67, "signature-then on." should read -- signature-then-encryption. --

<u>Column 7,</u>
Line 26, "signature then encryption Using" should read -- signature-then-encryption. Using --
Line 40, "Efficiency The" should read -- Efficiency-The --

<u>Column 8,</u>
Line 7, "s=(...)x," should read -- s=(...)/x, --; and "change" should read -- changing --
Line 17, "parameter" should read -- parameters --

<u>Column 9,</u>
Line 4, "ample," should read -- example, --
Line 36, "prior splitting" should read -- prior to splitting --
Line 39, "$r_{k2}(m)$." should read -- $r=KH_{k2}(m)$. --

<u>Column 10,</u>
Line 15, "prior" should read -- prior to --
Line 16, "$x_b$ b," should read -- $x_b$, --
Line 21, "symbolize" should read -- symbolized --

<u>Column 11,</u>
Line 30, "dispute, with" should read -- dispute. With --
Line 34, "m," should read -- m. --
Line 36, "g" should read -- g, --
Line 57, "$u=(y \cdot g^r)s$" should read -- $u=(y_a \cdot g^r)^s$ --
Line 67, "$u=(g \cdot y_a^r)^a = g^x$" should read -- $u=(g \cdot y_a^r)^s = g^x$ --

UNITED STATES PATENT AND TRADEMARK OFFICE
CERTIFICATE OF CORRECTION

PATENT NO. : 6,396,928 B1
DATED : May 28, 2002
INVENTOR(S) : Yuliang Zheng

It is certified that error appears in the above-identified patent and that said Letters Patent is hereby corrected as shown below:

Column 12,
Line 8, "tis" should read -- this --
Line 18, "q]calculates" should read -- q], calculates --; and "J=$u^{j1} \cdot g^{i2}$" should read -- J=$u^{j1} \cdot g^{j2}$ --
Line 42, "chewing" should read -- cheating --
Line 45, "J·$g^w$ w mod p," should read -- J·$g^w$ mod p, --

Column 13,
Line 3, "tough" should read -- through --; and "multi cast" should read -- multi-cast --
Line 24, "keys" should read -- key --
Line 25, "include" should read -- includes --
Line 30, "SCS" should read -- SCS1 --
Line 31, "SCSM." should read -- SCS1M. --
Line 36, "$R_4$," should read -- $R_\ell$, --
Line 47, "prior splitting" should read -- prior to splitting --
Line 56, "at" should read -- text --; and "($d_1$, $r_1$, $s_1$)" should read -- ($d_\ell$, $r_\ell$, $s_\ell$) --
Line 64, "r," should read -- $r_i$ --
Line 66, "R" should read -- $R_i$ --

Column 14,
Line 9, "Piques;" should read -- techniques: --
Line 12, "$r_i$=$KH_{t,2}$ (m, h)." should read -- $r_i$=$KH_{t,2}$ (m, h). -- "r," should read -- $r_i$ --
Line 12, "

Line 42, "user;." should read -- users. --
Line 47, "here" should read -- herein --
Line 56, "contact" should read -- context --

Column 15,
Line 1, "y," should read -- $y_a$, --
Line 36, "m" should be deleted

Column 16,
Line 4, "comprising;" should read -- comprising: --
Line 16, "and appending" should read -- and ¶appending --
Line 21, "$key_b$," should read -- key $x_b$, --

UNITED STATES PATENT AND TRADEMARK OFFICE
CERTIFICATE OF CORRECTION

PATENT NO. : 6,396,928 B1
DATED : May 28, 2002
INVENTOR(S) : Yuliang Zheng

It is certified that error appears in the above-identified patent and that said Letters Patent is hereby corrected as shown below:

Column 17,
Line 6, "15" should read -- 17 --

Column 18,
Line 4, "$d_1$;" should read -- $d_i$; --
Line 15, "cipher c" should read -- cipher text c --
Line 23, "cipher c" should read -- cipher text c --
Line 29, "secret" should read -- private --
Line 37, "cipher c" should read -- cipher text c --
Line 41, "hash" should read -- hash value --
Line 43, "hash" should read -- hash value --
Line 44, "cipher c" should read -- cipher text c --

Signed and Sealed this

Fifteenth Day of April, 2003

JAMES E. ROGAN
*Director of the United States Patent and Trademark Office*